United States Patent
Pollett (10) Patent No.: US 11,585,035 B2
(45) Date of Patent: Feb. 21, 2023

(54) WASHER APPLIANCE WITH REMOVABLE AGITATOR POST AND DEPRESSIBLE FEATURES FOR RELEASABLE ATTACHMENT

(71) Applicant: Haier US Appliance Solutions, Inc., Wilmington, DE (US)

(72) Inventor: James Quentin Pollett, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/204,221

(22) Filed: Mar. 17, 2021

(65) Prior Publication Data
US 2022/0298704 A1  Sep. 22, 2022

(51) Int. Cl.
*D06F 37/40* (2006.01)
*F16B 5/06* (2006.01)
*D06F 23/04* (2006.01)
*D06F 37/24* (2006.01)

(52) U.S. Cl.
CPC .............. *D06F 37/40* (2013.01); *D06F 23/04* (2013.01); *D06F 37/24* (2013.01); *F16B 5/0621* (2013.01)

(58) Field of Classification Search
None
See application file for complete search history.

(56) References Cited

U.S. PATENT DOCUMENTS

| | | | | |
|---|---|---|---|---|
| 4,077,239 A * | 3/1978 | Platt | ..................... | D06F 13/02 68/184 |
| 5,651,278 A * | 7/1997 | Pinkowski | .............. | D06F 13/02 68/133 |
| 10,787,761 B2 | 9/2020 | Czarnecki | | |
| 2004/0016267 A1* | 1/2004 | Clark | ..................... | D06F 13/02 68/133 |
| 2016/0032515 A1* | 2/2016 | Lee | ..................... | D06F 17/08 68/131 |
| 2021/0062382 A1* | 3/2021 | Andrejczuk | ............. | D06F 17/10 |

FOREIGN PATENT DOCUMENTS

| | | |
|---|---|---|
| BR | MU9002286 U2 | 3/2013 |
| CN | 2571803 Y | 9/2003 |
| CN | 203530690 U | 4/2014 |
| CN | 209652608 U | 11/2019 |

* cited by examiner

*Primary Examiner* — Cristi J Tate-Sims
(74) *Attorney, Agent, or Firm* — Dority & Manning, P.A.

(57) ABSTRACT

A washing appliance having a cabinet and a wash tub positioned in the cabinet and defining a wash chamber. A wash drum is rotatably mounted within the wash chamber and is configured for receiving articles for washing. An impeller is positioned in the wash drum. An agitator post is removably received into a an impeller recess using depressible features for releasable attachment. A removable cap can be placed on the top end of the agitator or into the impeller recess.

18 Claims, 6 Drawing Sheets

WASHER APPLIANCE WITH REMOVABLE AGITATOR POST AND DEPRESSIBLE FEATURES FOR RELEASABLE ATTACHMENT

FIELD OF THE INVENTION

The subject matter of the present disclosure relates generally to a washer appliance having a removable agitator post.

BACKGROUND OF THE INVENTION

Washing appliances (also referred to as "washing machines") typically include a drum or basket for receipt of articles to be washed. Top-load or vertical axis washing machines rotate the drum about the vertical axis at various points during the cleaning cycle. Various components provide for adding fluid into the drum and for imparting motion to the fluid and articles being washed in order to clean the articles.

Conventionally, the washing appliance may include a knob or other switch by which the user selects the level of fluid in the vertical axis washing machine based on e.g., the load size of articles being washed. The user visually determines the desired fluid level based on the anticipated load size. Many washing appliance users are also accustomed to seeing a conventional agitator in the form of a post extending up from the bottom of the wash basket and configured to impart motion to the fluid and articles during the cleaning cycles. Users may associate factors such as fluid level and movement of the agitator as directly related to the effective cleaning of the articles and may believe that increased fluids levels and agitator action are advantageous.

Certain articles may require more wash space within the wash drum. For example, large garments, pillows, comforters and the like may require more volume for washing than typical articles of clothing. Sufficient space is required in order for the washing appliance to be able to impart motion to the articles and wash fluid as part of the cleaning process. Conventional agitator designs having a post that extends into the wash basket necessarily consume at least part of this space. In addition, in such designs the agitator is typically not designed for removal by the user of the appliance.

Improvements in technology and increasing water conservation requirements have resulted in washing appliances that can use less water during the cleaning cycle and may use features other than the conventional post-type agitator for imparting the desired movement of the articles within the wash basket or wash drum. For example, rotatable impellers have been developed that can impart the desired movement while consuming less volume inside the wash drum than the conventional agitator. Some washing appliances utilizing such designs may also be able to use less water during the cleaning cycle as well.

However, user perception of washing machine features that provide for the best cleaning experience may contradict the actual impact of such features. As previously mentioned, consumers familiar with a conventional post-type agitator extending vertically from the bottom of the wash drum may be reluctant to purchase or use a vertical-axis washing appliance lacking such feature. Yet, depending on the particular design employed, an impeller located at the bottom of the wash drum may have more impact in creating the desired agitation and cleaning of articles than the conventional agitator—including under conditions of less water usage. And for larger loads or loads with larger articles, the space consumed by the conventional post-type agitator is needed for the articles.

Accordingly, a washing appliance with a removable agitator would be useful. More particularly, a washing appliance that allows the user to readily install or remove an agitator while still providing for effective cleaning of articles would be beneficial. Such as washing appliance that can allow for the installation or removal without requiring special tools would be particularly beneficial.

BRIEF DESCRIPTION OF THE INVENTION

Additional aspects and advantages of the invention will be set forth in part in the following description, or may be apparent from the description, or may be learned through practice of the invention.

In one exemplary embodiment, the present invention provides a washing appliance having a cabinet and a wash tub positioned in the cabinet and defining a wash chamber. A wash drum is rotatably mounted within the wash chamber and is configured for receiving articles for washing. An impeller is positioned in the wash drum. The impeller is rotational about a vertical axis and is configured for imparting motion to the articles during washing. The impeller defines a centrally-located impeller recess and a first plurality of openings spaced-apart along a circumferential direction around the centrally-located impeller recess. An agitator post is removably received into the centrally-located impeller recess. The agitator post is rotational about the vertical axis and extending along the vertical axis from the impeller. The agitator post includes a first plurality of depressible tabs spaced-apart along the circumferential direction and configured for removable receipt into the first plurality of openings of the impeller.

In another exemplary embodiment, the present invention provides a washing appliance having a cabinet and a wash tub positioned in the cabinet and defining a wash chamber. A wash drum is rotatably mounted within the wash chamber and is configured for receiving articles for washing. An impeller is positioned in the wash drum. The impeller is rotational about a vertical axis and is configured for imparting motion to the articles during washing. The impeller defines a centrally-located impeller recess. An agitator post is removably received into the centrally-located impeller recess. The agitator post is rotational about the vertical axis and extends along the vertical axis from the impeller. The impeller and agitator post define a first plurality of openings and a first plurality of depressible tabs spaced-apart along a circumferential direction around the centrally-located impeller recess. The first plurality of depressible tabs configured for removable receipt into the first plurality of openings to releasably secure the agitator post to the impeller.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of the same or similar reference numbers in the figures denotes same or similar features unless the context indicates otherwise.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
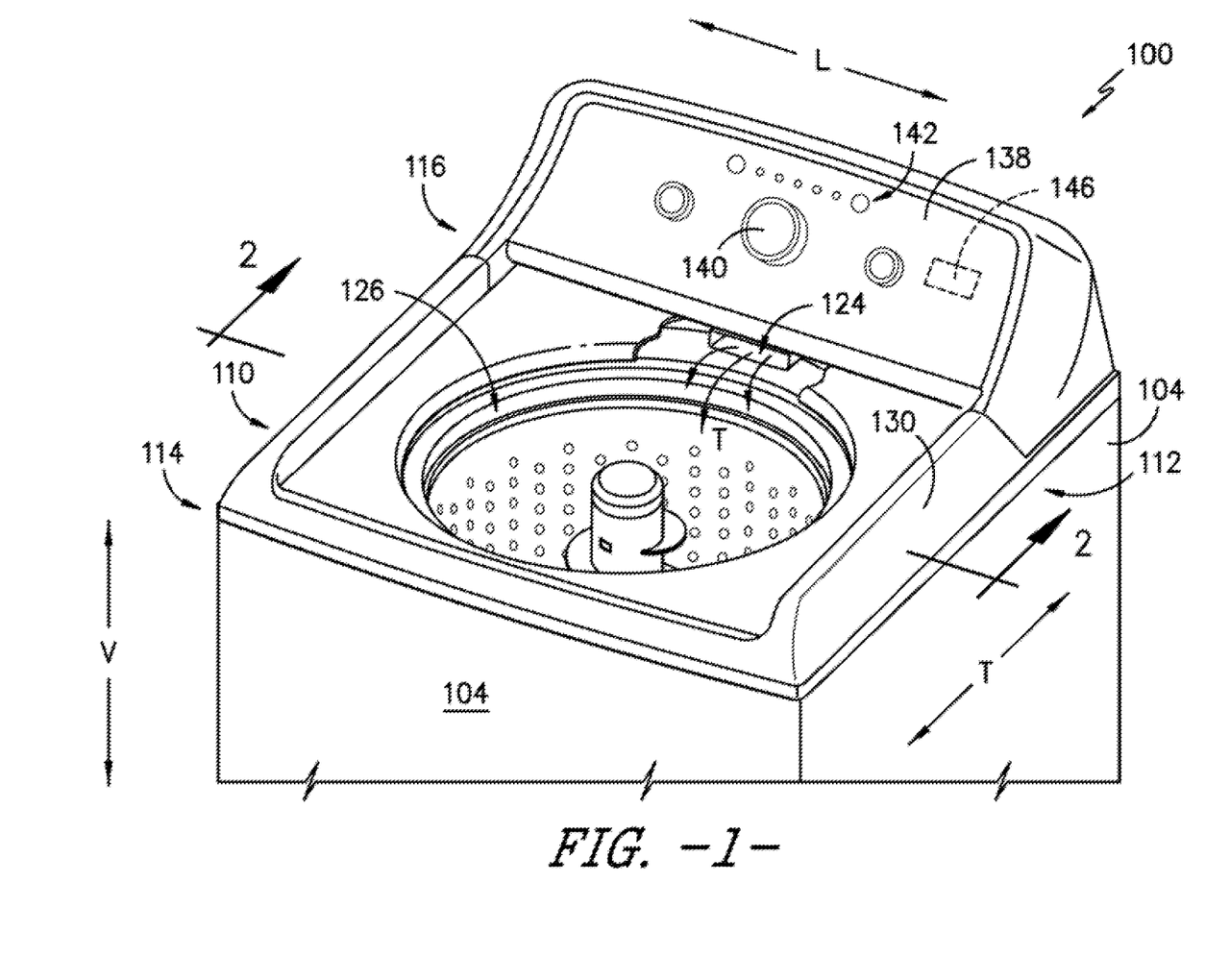
FIG. 1 provides a partial perspective view of an exemplary embodiment of a washing machine of the present invention.
Figure 2:
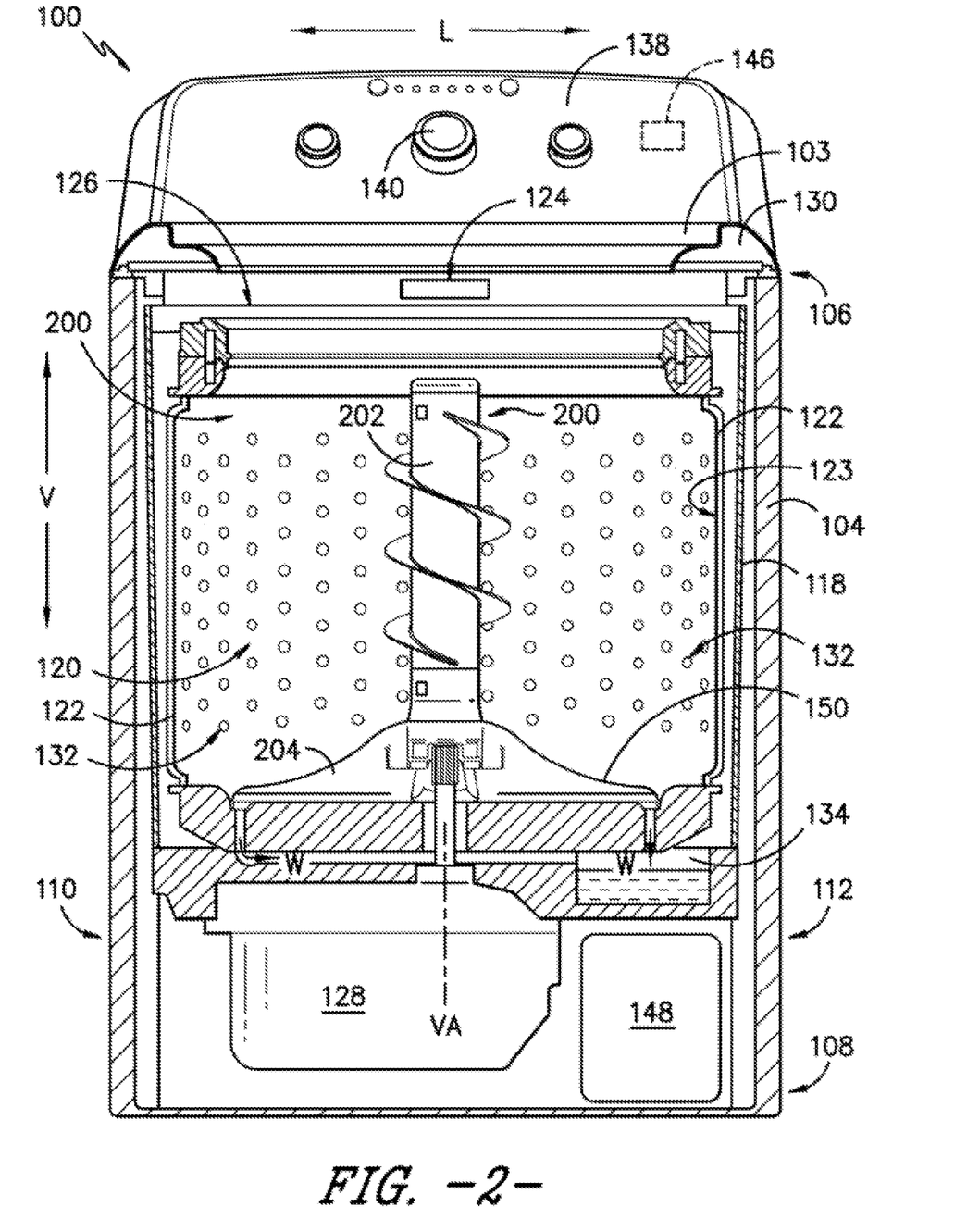
FIG. 2 provides a front cross-sectional view of the exemplary washing machine of FIG. 1.

FIGS. 1 and 2 illustrate an exemplary embodiment of a vertical axis washing appliance 100 of the present invention, which is also sometimes referred to as a top loading or vertical axis washing machine. In FIG. 1, a door 103 (shown in FIG. 2) has been removed for purposes of illustrating other features of the invention. Washing machine appliance 100 has a cabinet 104 that extends between a top portion 106 and a bottom portion 108 along the vertical direction V, between a first side (left) 110 and a second side (right) 112 along the lateral direction L, and between a front 114 and a rear 116 along the transverse direction T. The present invention is not limited to the particular vertical axis washing appliance 100 shown in the figures. Using the teachings disclosed herein, one or skill in the art will understand the other embodiments of a washing machine are also in the scope of the present invention.

As best shown in FIG. 2, a wash tub 118 is positioned within cabinet 102, defines a wash chamber 120, and is generally configured for retaining wash fluids during an operating cycle. A wash drum 122 is rotatably mounted within wash chamber 120 of wash tub 118. Washing machine appliance 100 further includes a dispenser 124 for dispensing wash fluid into wash tub 118. In addition, appliance 100 may include one or more additional dispensers for directing fluid into wash tub 118 and each dispenser may be separately controlled by one or more valves controlling flow to each dispenser independently of the others. The term "wash fluid" refers to a liquid used for washing and/or rinsing articles during an operating cycle and may include any combination of water, detergent, fabric softener, bleach, and other wash additives or treatments. As used herein, the term "cleaning cycle" includes a wash cycle, rinse cycle, spin cycle, or combinations thereof.

Wash drum 122 and cabinet 104 generally define an opening 126 (accessible through door 103) for receipt of articles for washing. Wash drum 122 rotates about a vertical axis of rotation VA (FIGS. 2 and 3) powered by motor assembly 128. According to the illustrated embodiment, the axis of rotation VA is substantially parallel to the vertical direction V. As used herein, terms of approximation, such as "approximately," "substantially," or "about," refer to being within a ten percent margin of error.

As illustrated, cabinet 104 of washing machine appliance 100 has a top panel 130. Top panel 130 defines an opening (FIG. 1) that coincides with opening 126 of wash tub 118 to permit a user access to wash drum 122. Door 103 is rotatably mounted to top panel 130 to permit selective access to opening 126. In particular, door 103 selectively rotates between a closed position and an open position. In the closed position, door 103 inhibits access to wash drum 122. Conversely, in the open position, a user can access wash drum 122. Although door 103 is illustrated as mounted to top panel 130, door 103 may alternatively be mounted to cabinet 104 or any other suitable support.

As best shown in FIG. 2, wash drum 122 further defines a plurality of perforations 132 to facilitate fluid communication between an interior of wash drum 122 and wash tub 118. In this regard, wash drum 122 is spaced apart from wash tub 118 to define a space for wash fluid to escape wash chamber 120. During a spin cycle, wash fluid within articles being washed (e.g., clothing) and within wash chamber 120 is urged through perforations 132 wherein it may collect in a sump 134 defined by wash tub 118. Washing machine appliance 100 further includes a pump assembly 148 (FIG. 2) that is located beneath wash tub 118 and wash drum 122 for gravity assisted flow when draining wash tub 118.

An exemplary article movement mechanism 200, including impeller 204 (FIGS. 2 and 3) and agitator post 202, is rotatably mounted within wash drum 122 to impart motion to articles and liquid in wash drum 122. More specifically, impeller 204 and agitator post 202 extend into wash drum 122 and assist agitation of articles disposed within wash drum 122 (as will be later described) during operation of washing appliance 100, e.g., to facilitate improved cleaning. In different embodiments, impeller 204 and agitator post 202 may rotate separately or together. Such rotations include a single action element (i.e., oscillatory only), a double action element (oscillatory movement at one end, single direction rotation at the other end) or a triple action element (oscillatory movement plus single direction rotation at one end, single direction rotation at the other end). Impeller 204, agitator post 202, and wash drum 122 are oriented to rotate about a vertical axis of rotation VA (which is substantially parallel to vertical direction V). For example, impeller 204 and/or agitator post 202 may rotate back and forth in alternate directions about vertical axis VA during a cleaning cycle. Additional description of the actions of impeller 204 and agitator post 202 are set forth below.

As stated, washing machine appliance 100 includes a motor assembly 128 in mechanical communication with wash drum 122 to selectively rotate wash drum 122 (e.g., during a wash cycle or a rinse cycle of washing machine appliance 100). In addition, motor assembly 128 may also be in mechanical communication with impeller 204 and agitator post 202. In this manner, motor assembly 128 may be configured for selectively and independently rotating or oscillating wash drum 122, impeller 204, and/or agitator post 202 during various operating cycles of washing machine appliance 100.

Figure 3:
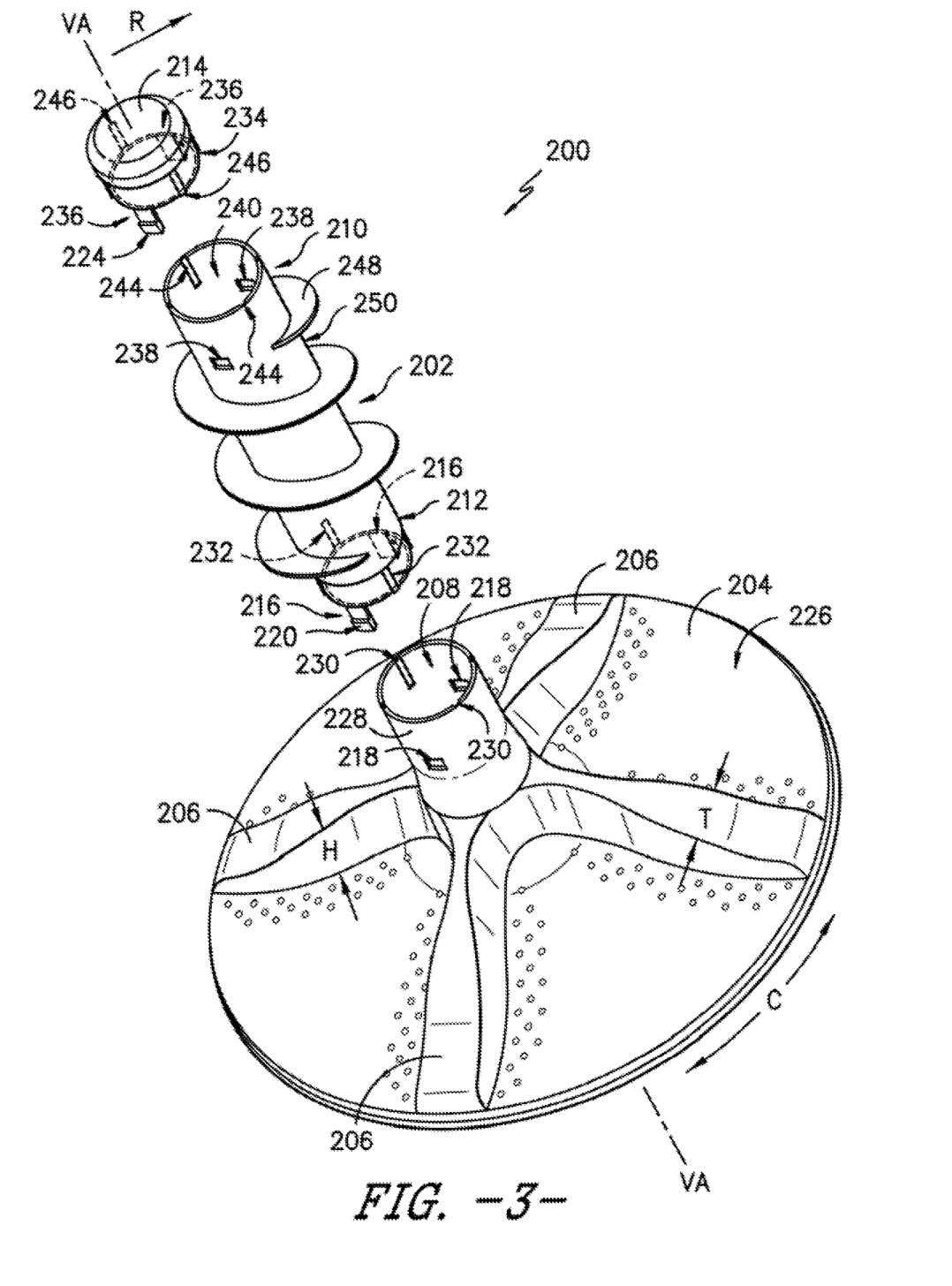
FIG. 3 provides an exploded perspective view of an exemplary embodiment of an article movement mechanism of the present invention in which an exemplary agitator post is included.

Referring still to FIGS. 1 through 3, a control panel 138 with at least one input selector 140 (FIGS. 1 and 2) extends from top panel 130. Control panel 138 and input selector 140 collectively form a user interface input for operator selection of machine cycles and features of washing appliance 100. A display 142 of control panel 138 indicates selected features, operation mode, a countdown timer, and/or other items of interest to appliance users regarding operation.

Operation of washing machine appliance 100 is controlled by at least one controller or processing device 146 that is operatively coupled to control panel 138 for user manipulation to select washing machine cycles and features. In response to user manipulation of control panel 138, controller 146 operates the various components of washing machine appliance 100 to execute selected machine cycles and features. According to an exemplary embodiment, controller 146 may include a memory and microprocessor, such as a general or special purpose microprocessor operable to execute programming instructions or micro-control code associated with methods described herein. Alternatively, controller 146 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 138 and other components of washing machine appliance 100 may be in communication with controller 146 via one or more signal lines or shared communication busses.

During operation of washing machine appliance 100, laundry items are loaded into wash drum 122 through opening 126, and washing operation is initiated through operator manipulation of input selector 140. Water, detergent and/or other fluid additives can be added to wash tub 118 and wash drum 122 through dispenser 124 and/or other dispensers as well. Controller 146 can operate one or more valves of washing appliance 100 to provide for filling wash tub 118 and wash drum 122 to the appropriate level for the amount of articles being washed and/or rinsed. By way of example for a wash mode, once wash drum 122 is properly filled with fluid, the contents of wash drum 122 can be agitated (e.g., with article movement mechanism 200 discussed previously) for washing of laundry items in wash drum 122. The specific operation of wash appliance 100 by controller 146 will depend on various inputs including the cycle and other settings that may be selected by the user, the amount of article placed in wash chamber 120, and other variables as will be understood by one of skill in the art using the teachings disclosed herein.

By way of continuing example, after wash tub 118 is filled and the agitation phase of the wash cycle is completed, wash tub 118 and drum 122 can be drained, e.g., by drain pump assembly 148. Laundry articles can then be rinsed by again adding fluid to wash drum 122 and tub 118 again depending on the specifics of the cleaning cycle selected by a user. The impeller 204 and/or agitator post 202 may also provide agitation within wash drum 122. One or more spin cycles may also be used as part of the cleaning process. In particular, a spin cycle may be applied after the wash cycle and/or after the rinse cycle in order to wring wash fluid from the articles being washed. During a spin cycle, wash drum 122 is rotated at relatively high speeds to help wring fluid from the laundry articles through perforations 132. After articles disposed in wash drum 122 are cleaned and/or washed, the user can remove the articles from wash drum 122, e.g., by reaching into wash drum 122 through opening 126.

As will now be further described, the exemplary article movement mechanism 200 allows desired movements to be imparted to articles in wash drum 122 during a cleaning cycle. These movements, which can include combinations of movement along vertical direction V and radial direction R, assist in cleaning articles while in the wash fluid. One exemplary pattern of movement will now be described. Using the teachings disclosed herein, one of skill in the art will understand that other patterns or paths of fluid and/or article movement in drum 122 may be used as well in other embodiments of the invention.

For example, after articles to be cleaned and fluid are loaded into cylindrical wash drum 122, rotations of impeller 204 may impart an inverse toroidal motion to articles in wash drum 122 during a cleaning cycle. In such motion, articles may move vertically upward from impeller 204 along agitator post 202 and then radially outward (the radial direction is indicated by arrow R in FIG. 3, which is a direction perpendicular to vertical axis VA) at the top of an article load towards the cylindrical portion 123 of wash drum 122.

The articles then move vertically downward towards impeller 204 and radially inward along the bottom of an article load towards agitator post 202 where the cycle repeats under the influence of components such as impeller 204. Accordingly, during a cleaning cycle, this inverse toroidal motion results generally in a turnover of articles in wash drum 122. As used herein, "inverse toroidal motion" or "inverse toroidal movement" does not refer to the specific movement necessarily of any individual article but to the overall movement of articles in wash drum 122 instead. A variety of factors create the inverse toroidal motion the occurs in wash drum 122 including, for example, the relative amounts of fluid and articles present in drum 122, the shape of wash drum 122, the configuration and movements of agitator post 202, the configuration and movements of impeller 204, and other factors as well.

With reference to FIG. 3, for this exemplary embodiment, impeller 204 includes a plurality of radial lobes 206 spaced apart along circumferential direction C. Each lobe 206 has thickness T as measured along the circumferential direction C that varies moving along radial direction R. For the exemplary embodiment shown, thickness T narrows and then widens moving along radial direction R and away from agitator post 202. Each lobe 206 also has a height H above impeller base 226 along a direction parallel to the vertical axis VA that also varies along radial direction R. For the exemplary embodiment shown, height H gradually decreases moving along radial direction R and away from agitator post 202. Impeller 204 as depicted in FIGS. 2 and 3 is provided by way of example only. Other shapes and configurations may be used as well.

As noted, the configuration of impeller 204 assists in creating the desired movement of fluid and/or articles within wash drum 122. Article movement mechanism 200 also includes an agitator post 202 which may assist in providing or supporting the desired movement. In addition, using features as will also be described, agitator post 202 can be readily installed or removed by a user of appliance 100 without the use of special tools. Removal of agitator post 202 allows more volume within wash drum 122 for the receipt of articles and/or fluid. At the same time, agitator post 202 can be readily installed as may be needed for a particular movement of articles in drum 122 or as may be based on e.g., user preference. An exemplary embodiment of agitator post 202 is set forth in the figures and will now be further described.

Figure 4:
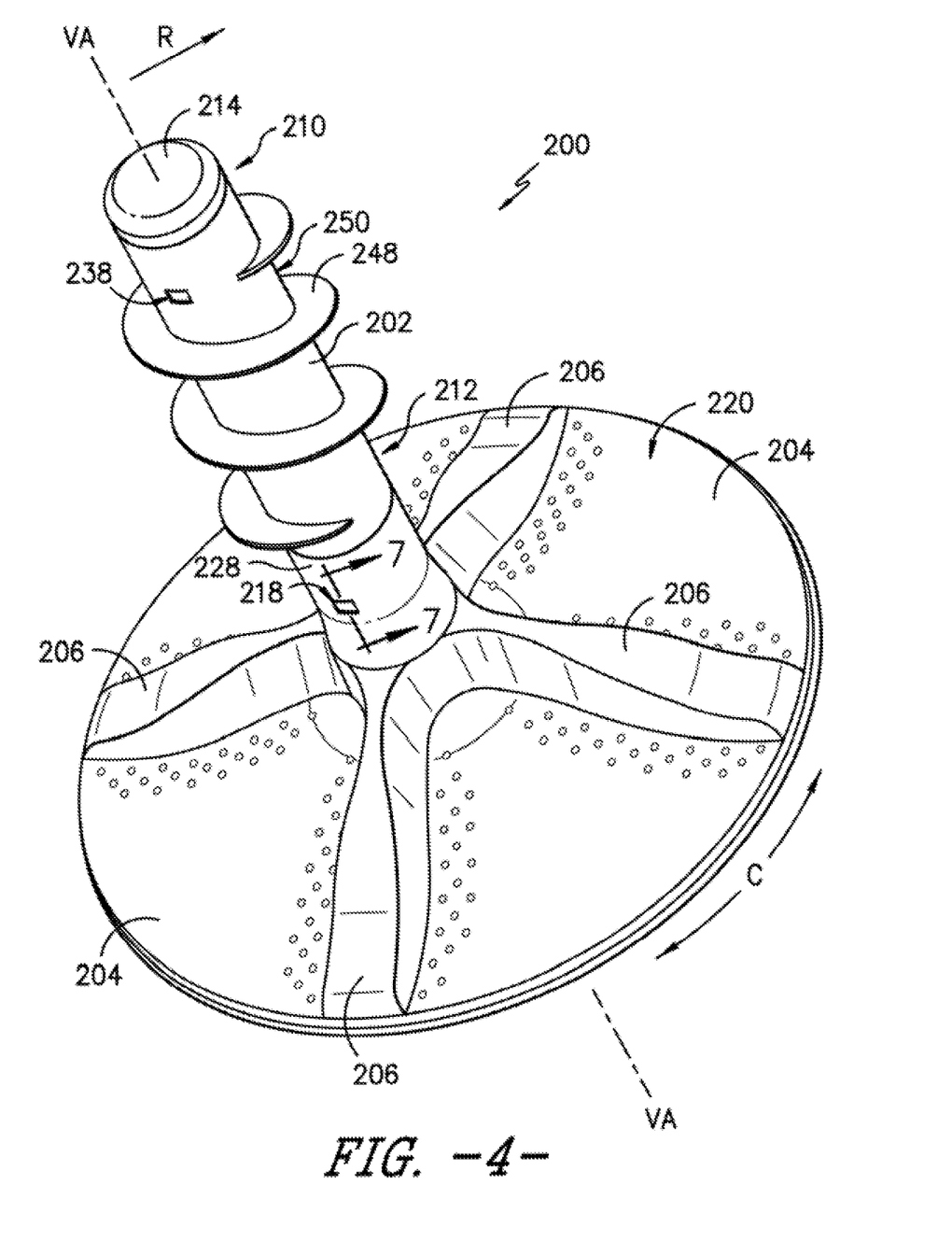
FIG. 4 provides an assembled perspective view of the exemplary article movement mechanism of FIG. 3.

Referring to FIGS. 3 and 4, exemplary agitator post 202 is positioned adjacent to impeller 204 and is removably received into a centrally-located impeller recess 208 defined by impeller 204. Agitator post 202 extends from impeller 204 along vertical axis VA between a top end 210 and a bottom end 212. Agitator post 202 and is rotational about vertical axis VA along with impeller 204.

At bottom end 212, a first plurality of depressible tabs 216 protrude or extend along vertical direction V or parallel to vertical axis VA. For this exemplary embodiment, only a pair of depressible tabs 216 is shown. However, in other embodiments, three or more depressible tabs 216 may be used. Additionally, for this embodiment, depressible tabs 216 are uniformly spaced apart along circumferential direction C of impeller 204, which in this embodiment is at 180 degrees from each other. In the case of three depressible tabs 216, such could be spaced at 120 degrees from each other along circumferential direction C and so forth where more depressible tabs 216 are employed.

Impeller 204 defines a first plurality of openings 218 spaced-apart along circumferential direction C around recess 208. Each opening 218 is configured for removable receipt of one of the depressible tabs 216. For this exemplary embodiment, only a pair of openings 218 is shown in order to match the pair of depressible tabs 216. However, as with tabs 216, in other embodiments, three or more openings 218 may be used. Additionally, for this embodiment, openings 218 are uniformly spaced apart along circumferential direction C of impeller 204, which in this embodiment is at 180 degrees from each other in order to mate with depressible tabs 216. In the case of three depressible tabs 216, openings 218 also could be spaced at 120 degrees from each other along circumferential direction C and so forth where more depressible tabs 216 are employed.

Depressible tabs 216 allow agitator post 202 to be readily installed or removed from centrally-located impeller recess 208. More particularly and with reference to FIG. 7, depressible tabs 216 can be depressed by a user applying a force in the direction of arrow D towards vertical axis VA. Each depressible tab 216 is constructed from a flexible material that allows movement back and forth along radial direction R. The user can, for example, apply fingers to squeeze depressible tabs 216 on opposite sides of agitator post 202 so as to move each tab radially inward. Releasing the depressible tabs 216 allows the tabs to move radially outward in the direction of arrow S. Tabs 216 may be provided in a color different from agitator post 202 and/or impeller 204 for ease in locating during installation and removal.

Figure 7:
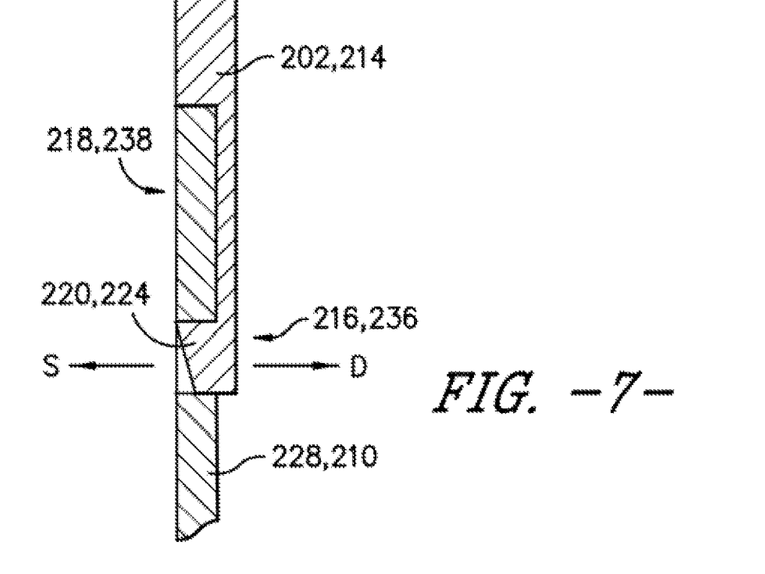
FIG. 7 is a cross-sectional view along lines 7-7 of FIGS. 4 and 6 as further described herein.

With reference to FIGS. 3, 4, and 7, each depressible tab defines a hook 220 that is received into one of openings 218 in the first plurality of openings 218 of impeller 204 and latches onto the circular cup 228 formed by impeller 204. Upon being depressed, depressible tabs 216 bend such that each hook 220 is displaced radially inward (along radial direction R towards vertical axis VA), thereby allowing agitator post 202 to slide upwardly along vertical axis VA and be removed from impeller recess 208. Conversely, to install agitator post 202 into impeller recess 208, the user can press depressible tabs 216 radially inward and slide post 202 downwardly along vertical axis VA and into impeller recess 208.

As shown in FIG. 3, impeller 204 defines a plurality of linear grooves 230 that are spaced apart along circumferential direction C around the centrally-located impeller recess 208 and extend along vertical direction V. In a complementary manner, agitator post 202 defines a plurality of linear teeth 232 that project from post 202 along radial direction and extend longitudinally along vertical direction V. When agitator post 202 is inserted into impeller recess 208 as previously described, grooves 230 and teeth 232 help the user to properly align post 202 so that depressible tabs 216 will be properly received into openings 218. Linear grooves 230 and teeth 232 also help transfer torque between impeller 204 and agitator post 202 during cleaning operations. A different number of grooves 230 and teeth 232 may be used from what is shown in the figures in other embodiments of the invention.

At top end 210, agitator post 202 is equipped with a removable cap 214. The bottom 234 of cap 214 includes a second plurality of depressible tabs 236 that protrude or extend along vertical direction V or parallel to vertical axis VA. For this exemplary embodiment, only a pair of depressible tabs 236 are shown on cap 214. However, in other embodiments, three or more depressible tabs 236 may be used. Additionally, for this embodiment, depressible tabs 236 are uniformly spaced apart along circumferential direction C of impeller 204, which in this embodiment is at 180 degrees from each other. In the case of three depressible tabs 236, such could be spaced at 120 degrees from each other along circumferential direction C and so forth where more depressible tabs 236 are employed. The number of depressible tabs 236 that are utilized will match the number of depressible tabs 216 on agitator post 202 as will be further understood.

Top end 210 of agitator post 202 defines a second plurality of openings 238 spaced-apart along circumferential direction C around an agitator recess 240. Each opening 238 is configured for removable receipt of one of the depressible tabs 236. For this exemplary embodiment, only a pair of openings 238 is shown in order to match the pair of depressible tabs 236. However, as with tabs 236, in other embodiments, three or more openings 238 may be used. Additionally, for this embodiment, openings 238 are uniformly spaced apart along circumferential direction C of impeller 204, which in this embodiment is at 180 degrees from each other in order to mate with depressible tabs 236. In the case of three depressible tabs 236, openings 238 also could be spaced at 120 degrees from each other along circumferential direction C and so forth where more depressible tabs 236 are employed.

Depressible tabs 236 allow removable cap 214 to be readily installed or removed from either agitator recess 240 or centrally-located impeller recess 208 in a manner similar to that previously described for depressible tabs 216. With reference again to FIG. 7, depressible tabs 236 can be depressed by a user applying a force in the direction of arrow D towards vertical axis VA. Each depressible tab 236 is constructed from a flexible material that allows movement back and forth along radial direction R. The user can, for example, apply their fingers to squeeze depressible tabs 236 on opposite sides of removable cap 214 so as to move each tab radially inward. Releasing the depressible tabs 236 allows the tabs to move radially outward in the direction of arrow S.

With reference to FIGS. 3, 4, and 7, each depressible tab defines a hook 224 that is received into one of openings 238 in the second plurality of openings 238 at the top end 210 of agitator post 202 to latch on thereto. Upon being depressed, depressible tabs 236 bend such that each hook 224 is displaced radially inward, thereby allowing removable cap 214 to slide upwardly along vertical axis VA and be removed from agitator recess 240. Conversely, to install removable cap 214 into agitator recess 240, the user can press depressible tabs 236 radially inward and slide removable cap 214 downwardly along vertical axis VA and into agitator recess 240.

In a manner that matches linear grooves 230 and linear teeth 232, as shown in FIG. 3, top end 210 of agitator 202 defines a plurality of linear grooves 244 that are spaced apart along circumferential direction C around agitator recess 240 and extend along vertical direction V. In a complementary manner, removable cap 214 defines a plurality of linear teeth 246 that project from cap 214 along radial direction and extend longitudinally along vertical direction V. When cap 214 is inserted into agitator recess 240 as previously described, grooves 244 and teeth 246 help the user to properly align cap 214 so that depressible tabs 236 will be properly received into openings 238. A different number of grooves 244 and teeth 246 may be used from what is shown in the figures in other embodiments of the invention.

Figure 5:
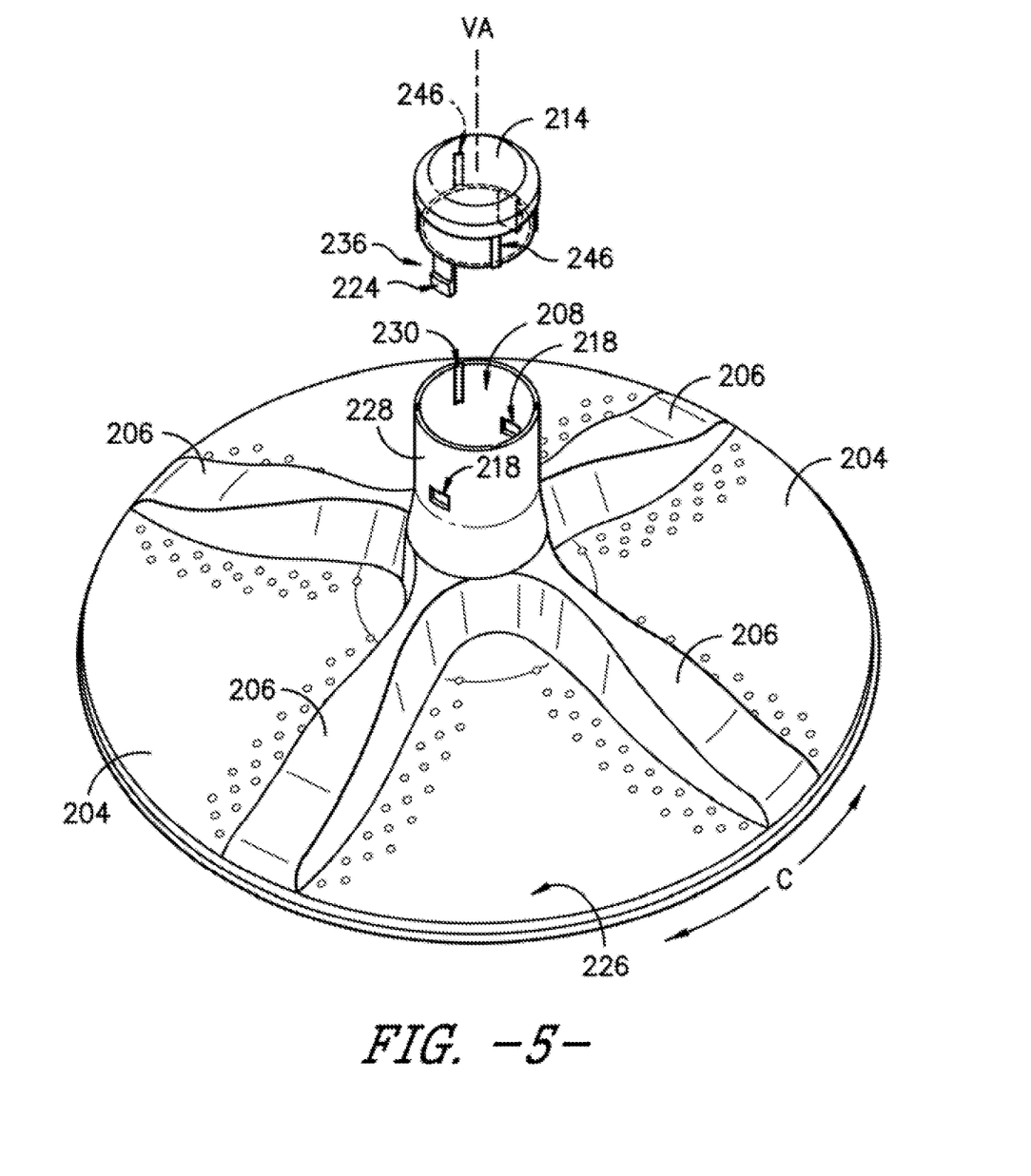
FIG. 5 is an exploded perspective view of the exemplary article movement mechanism of the present invention in which the exemplary agitator post has been removed and a removable cap is shown.
Figure 6:
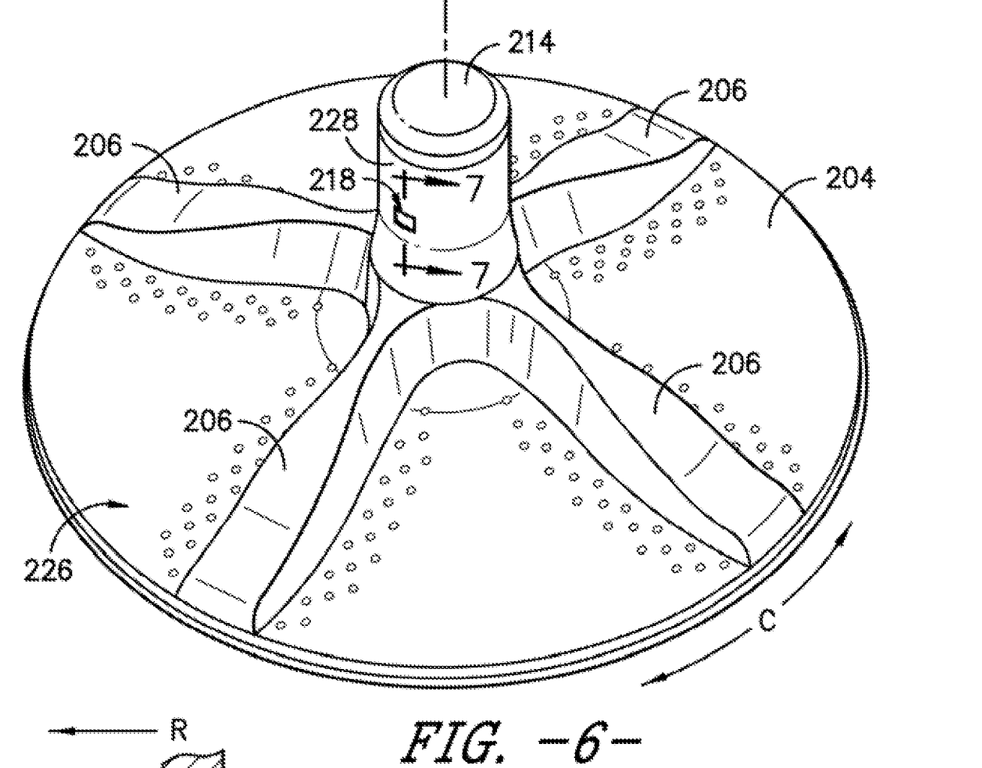
FIG. 6 is an assembled perspective view of the exemplary article movement mechanism of the present invention in which the exemplary agitator post has been removed and a removable cap is installed instead.

When a user removes agitator post 202 from impeller recess 208, removable cap 214 can be used to cover recess 208. Cap 214 can be removed from top end 210 of agitator post 202 as previously described. In a manner similar to how cap 214 is received and latched into agitator recess 240, cap 214 can be latched into impeller recess 208 as depicted in FIGS. 5 and 6. In this way, a user can utilize appliance 100 without the presence of agitator post 202 as desired. At the same time, because agitator post 202 may be appealing to certain users who conventionally associate having a vertical agitator post with the cleaning ability of a washing appliance, agitator post 202 may be installed by the user as desired.

Agitator post 202 includes a helical vane 248 extending from outer surface 250. Other configurations for post 202 may be used as well including multiple vanes or other features. Similarly, impeller 204 may have different configurations of lobes or other features.

Using the teachings disclosed herein, one of ordinary skill in the art will understand that the positions of the plurality of depressible tabs and corresponding plurality of openings may be switched. For example, depressible tabs 216 could be located on impeller 204 extending vertically upward while openings are provided on bottom end 212 of agitator post 202. Similarly, tabs 236 could be provided on top end 210 of agitator post 202 while openings 238 may be provided by removable cap 214. Combinations of openings and tabs may be included on the same part as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing appliance, comprising:
  a cabinet;
  a wash tub positioned in the cabinet and defining a wash chamber;
  a wash drum rotatably mounted within the wash chamber and configured for receiving articles for washing;
  an impeller positioned in the wash drum, the impeller being rotational about a vertical axis and configured for imparting motion to the articles during washing, the impeller defining a centrally-located impeller recess and a first plurality of openings spaced-apart along a circumferential direction around the centrally-located impeller recess; and
  an agitator post removably received into the centrally-located impeller recess, the agitator post being rotational about the vertical axis and extending along the vertical axis from the impeller, the agitator post comprising a first plurality of depressible tabs spaced-apart along the circumferential direction and configured for removable receipt into the first plurality of openings of the impeller.

2. The washing appliance of claim 1, wherein the agitator post defines a top end and a bottom end, and wherein a removable cap is received at the top end and the first plurality of depressible tabs extend along a vertical direction from the bottom end.

3. The washing appliance of claim 2, wherein the top end of the agitator post defines an agitator recess and a second plurality of openings spaced apart along the circumferential direction around the agitator recess, and wherein the removable cap comprises a second plurality of depressible tabs configured for removable receipt into the second plurality of openings of the agitator post or the first plurality of openings of the impeller.

4. The washing appliance of claim 1, wherein the impeller defines a plurality of grooves spaced apart along the circumferential direction around the centrally-located impeller recess, and wherein the agitator post defines a plurality of teeth spaced apart along the circumferential direction and projecting along a radial direction, the teeth configured for removable receipt into the plurality of grooves.

5. The washing appliance of claim 4, wherein the plurality of grooves and the plurality of teeth extend along a vertical direction.

6. The washing appliance of claim 1, wherein the agitator post further comprises a helical vane extending around an outer surface of the agitator post.

7. The washing appliance of claim 1, wherein the first plurality of depressible tabs each comprises a hook for releasably locking the agitator post into the centrally-located impeller recess to rotationally lock the agitator post with the impeller.

8. The washing appliance of claim 1, wherein the first plurality of depressible tabs each comprises a flexible material and are each configured to be movable along a radial direction in and out of the first plurality of openings of the impeller.

9. The washing appliance of claim 1, wherein the impeller comprises a plurality of lobes spaced-apart along the circumferential direction of the impeller.

10. The washing appliance of claim 9, wherein the impeller is configured for imparting an inverse toroidal motion to the articles during a cleaning cycle.

11. A washing appliance, comprising:
  a cabinet;
  a wash tub positioned in the cabinet and defining a wash chamber;
  a wash drum rotatably mounted within the wash chamber and configured for receiving articles for washing;
  an impeller positioned in the wash drum, the impeller being rotational about a vertical axis and configured for imparting motion to the articles during washing, the impeller defining a centrally-located impeller recess; and an agitator post removably received into the centrally-located impeller recess, the agitator post being rotational about the vertical axis and extending along the vertical axis from the impeller;

wherein the impeller and agitator post define a first plurality of openings and a first plurality of depressible tabs spaced-apart along a circumferential direction around the centrally-located impeller recess, the first plurality of depressible tabs configured for removable receipt into the first plurality of openings to releasably attach the agitator post to the impeller, and wherein the impeller and agitator post define a first plurality of teeth and a first plurality of linear grooves formed along the vertical axis, the first plurality of teeth being insertable into the first plurality of linear grooves so as to rotationally lock the agitator post with the impeller.

12. The washing appliance of claim 11, wherein the agitator post defines a top end and a bottom end, and wherein a removable cap is received at the top end.

13. The washing appliance of claim 11, wherein the first plurality of depressible tabs each comprises a hook for releasably locking the agitator post into the centrally-located impeller recess.

14. The washing appliance of claim 11, wherein the first plurality of depressible tabs each comprises a flexible material and are each configured to be movable along a radial direction in and out of the first plurality of openings.

15. The washing appliance of claim 11, wherein the impeller comprises a plurality of lobes spaced-apart along the circumferential direction of the impeller.

16. The washing appliance of claim 11, wherein the impeller is configured for imparting an inverse toroidal motion to the articles during a cleaning cycle.

17. The washing appliance of claim 11, wherein a top end of the agitator post defines an agitator recess, and wherein the top end of the agitator post and a removable cap define a second plurality of openings and a second plurality of depressible tabs spaced apart along the circumferential direction around the agitator recess, the second plurality of depressible tabs configured for removable receipt into the second plurality of openings to releasably attach the removable cap to the agitator post.

18. The washing appliance of claim 11, wherein the removable cap is also configured for receipt into the centrally-located impeller recess when the agitator post is not present.

* * * * *